United States Patent
Honjo et al.

(10) Patent No.: US 10,043,313 B2
(45) Date of Patent: Aug. 7, 2018

(54) INFORMATION PROCESSING APPARATUS, INFORMATION PROCESSING METHOD, INFORMATION PROCESSING SYSTEM, AND STORAGE MEDIUM

(71) Applicant: CANON KABUSHIKI KAISHA, Tokyo (JP)

(72) Inventors: Tomoya Honjo, Tokyo (JP); Masakazu Matsugu, Yokohama (JP); Yasuhiro Komori, Tokyo (JP); Yoshinori Ito, Tokyo (JP); Hideo Noro, Tokyo (JP); Akira Ohno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 241 days.

(21) Appl. No.: 14/936,534

(22) Filed: Nov. 9, 2015

(65) Prior Publication Data
US 2016/0133054 A1    May 12, 2016

(30) Foreign Application Priority Data

Nov. 12, 2014  (JP) .................. 2014-229910

(51) Int. Cl.
*G06T 19/00* (2011.01)
*G06K 9/00* (2006.01)

(52) U.S. Cl.
CPC ........ *G06T 19/006* (2013.01); *G06K 9/00671* (2013.01); *G06K 9/00704* (2013.01)

(58) Field of Classification Search
None
See application file for complete search history.

(56) References Cited

U.S. PATENT DOCUMENTS

| | | | | |
|---|---|---|---|---|
| 2006/0105838 A1* | 5/2006 | Mullen | ................. | A63F 13/211 463/31 |
| 2013/0088516 A1* | 4/2013 | Ota | ........................ | G06T 11/00 345/633 |
| 2014/0049559 A1* | 2/2014 | Fleck | .................. | G03H 1/2249 345/633 |
| 2014/0267420 A1* | 9/2014 | Schowengerdt | ........ | G06F 3/012 345/633 |
| 2015/0235630 A1* | 8/2015 | Rasmusson | ............ | G09G 5/377 345/592 |
| 2016/0042563 A1* | 2/2016 | Ur | ........................ | G06T 19/006 345/633 |
| 2016/0049013 A1* | 2/2016 | Tosas Bautista | ...... | G06T 19/006 345/633 |

FOREIGN PATENT DOCUMENTS

JP    2011-242934 A    12/2011

OTHER PUBLICATIONS

Krahenbuhl et al., "Efficient Inference in Fully Connected CRFs with Gaussian Edge Potentials", Advances in Neural Information Processing Systems 24, (2011), pp. 1-9.

* cited by examiner

*Primary Examiner* — James A Thompson
(74) *Attorney, Agent, or Firm* — Canon U.S.A., Inc. IP Division

(57) ABSTRACT

To appropriately superimpose and display a virtual object on an image of a real space, an information processing apparatus according to exemplary embodiment of the present invention determines the display position of the virtual object based on information indicating an allowable degree of superimposition of a virtual object on each real object in the image of the real space, and a distance from a real object for which a virtual object is to be displayed in association with the real object.

12 Claims, 12 Drawing Sheets

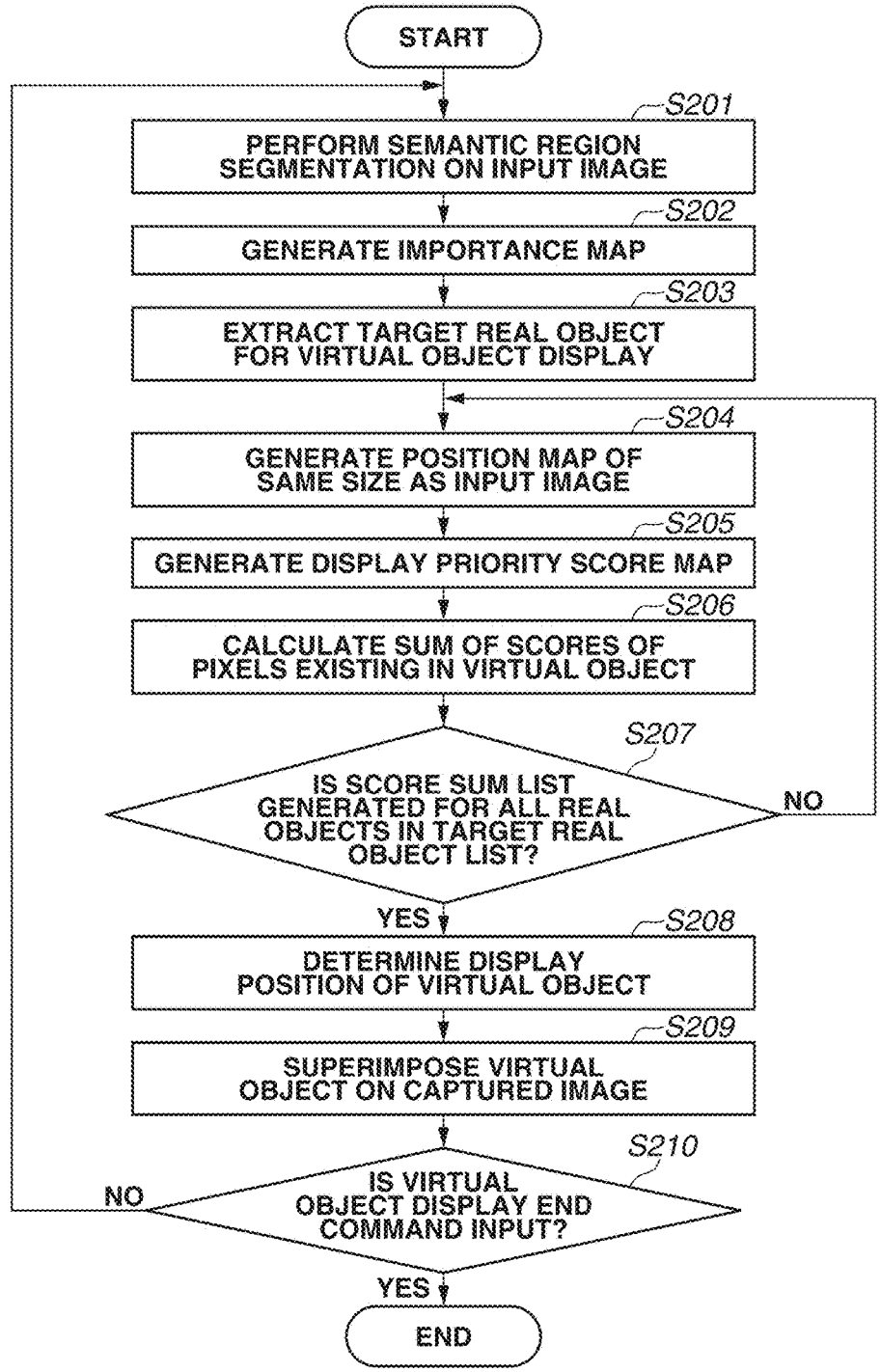

FIG.4

| REAL OBJECT NAME | IMPORTANCE |
|---|---|
| ... | ... |
| SKY | 0.1 |
| BUILDING A | 0.8 |
| BUILDING B | 0.7 |
| BUILDING C | 0.7 |
| ... | ... |

FIG.5A

| VIRTUAL OBJECT NUMBER | SHAPE | BOUNDING RECTANGLE SIZE | REAL OBJECT | CONTENTS |
|---|---|---|---|---|
| 0001 | 💬 | 50 × 30 | BUILDING A | "BUILDING A" |
| 0002 | 💬 | 50 × 30 | BUILDING B | "BUILDING B" |

FIG.5B

| VIRTUAL OBJECT NUMBER | SHAPE | BOUNDING RECTANGLE SIZE | REAL OBJECT | CONTENTS |
|---|---|---|---|---|
| 0101 | 💬 | 50 × 30 | CAR F | "CAR F" |

FIG.6A

| COORDINATES (x, y) | SUM OF SCORES |
|---|---|
| (0, 0) | 104.5 |
| (1, 0) | 107.2 |
| (2, 0) | 111.3 |
| ... | ... |
| (80, 59) | 41.7 |
| (81, 59) | 40.9 |
| (82, 59) | 41.3 |
| ... | ... |

FIG.6B

| COORDINATES (x, y) | SUM OF SCORES |
|---|---|
| (0, 0) | 935.7 |
| ... | ... |
| (50, 0) | 863.9 |
| ... | ... |
| (160, 51) | 16.1 |
| (161, 51) | 15.7 |
| (162, 51) | 16.2 |
| ... | ... |

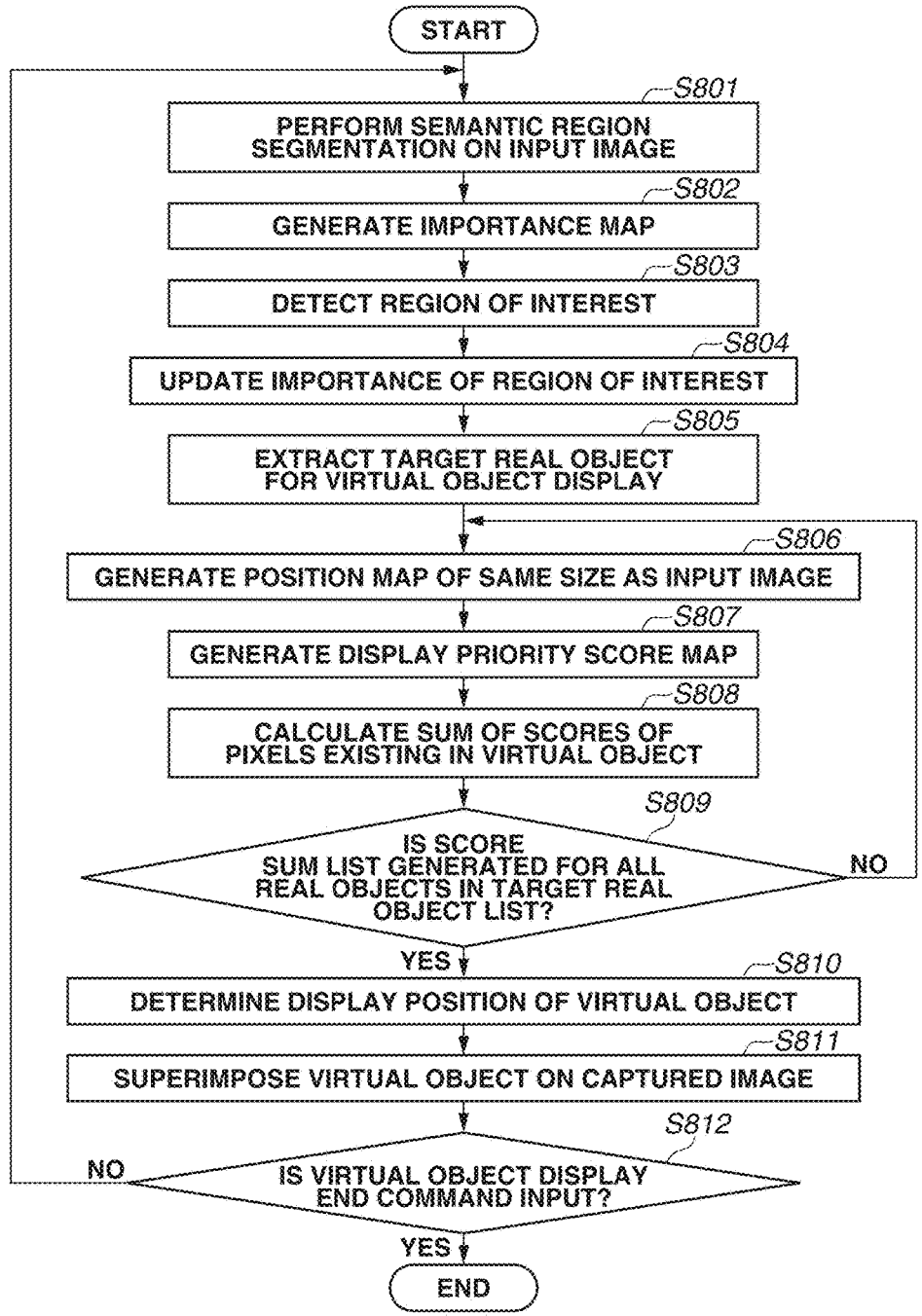

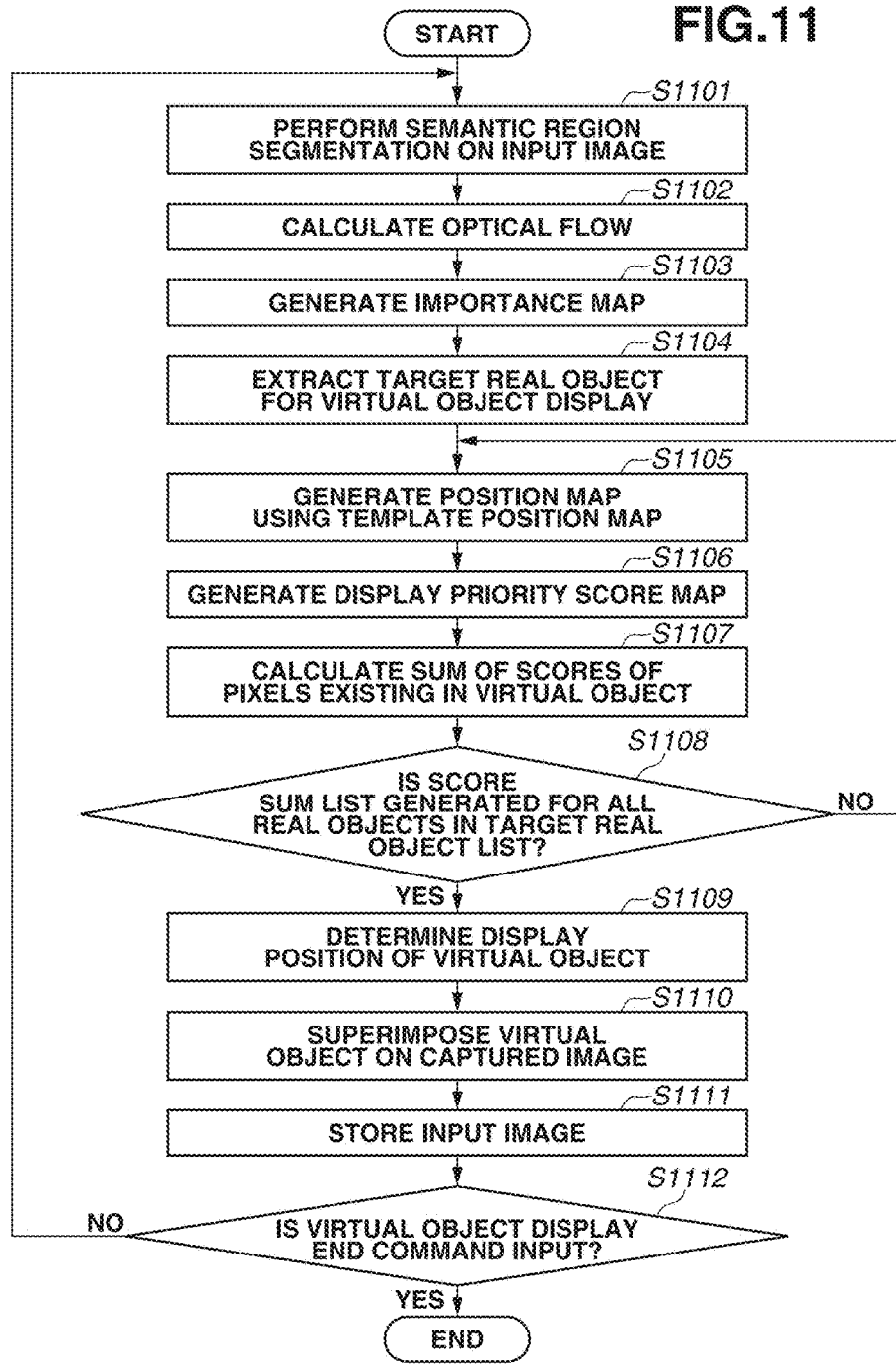

US 10,043,313 B2

INFORMATION PROCESSING APPARATUS, INFORMATION PROCESSING METHOD, INFORMATION PROCESSING SYSTEM, AND STORAGE MEDIUM

BACKGROUND OF THE INVENTION

Field of the Invention

The present invention relates to a technique for displaying a virtual object on an image of a real space.

Description of the Related Art

Smartphones including a camera, and wearable terminals including a transmission type display have appeared on the market, and techniques for superimposing and displaying some sort of information as a virtual object on a captured image of a real space by using computer graphics have been actively developed. Such techniques are called augmented reality (AR).

Japanese Patent Application Laid-Open No. 2011-242934 discusses a technique in which an object (superimposition-prohibited real object) on which superimposition of a virtual object is prohibited is detected from a captured image of a real space and the display position of the virtual object is controlled not to hide the superimposition-prohibited real object.

However, in the method discussed in Japanese Patent Application Laid-Open No. 2011-242934, the display position of a virtual object is controlled based on a superimposition-prohibited real object, and therefore there may be a case where a virtual object cannot be displayed appropriately. For example, in a case where an original position in which a virtual object is supposed to be displayed is surrounded by superimposition-prohibited real objects, there arises a problem that the virtual object is displayed in a position far from the original position.

SUMMARY OF THE INVENTION

According to an aspect of the present invention, an information processing apparatus includes a recognition unit configured to recognize real objects in an acquired image of a real space, a determination unit configured to determine, based on information indicating an allowable degree of superimposition of a virtual object on each of the recognized real objects, and a distance from a real object, among the recognized real objects, for which a virtual object is to be displayed in association with the real object, a display condition for displaying the virtual object on the image of the real space, and a display control unit configured to superimpose and display the virtual object on the image of the real space based on the display condition.

Further features of the present invention will become apparent from the following description of exemplary embodiments with reference to the attached drawings.

BRIEF DESCRIPTION OF THE DRAWINGS

FIG. 2 is a flowchart illustrating an information processing method according to the first exemplary embodiment.

FIG. 4 illustrates importance information of real objects according to the first exemplary embodiment.

FIGS. 5A and 5B illustrate virtual object information lists according to the first and a third exemplary embodiments, respectively.

FIGS. 6A and 6B each illustrate a score sum list according to the first exemplary embodiment.

FIG. 8 is a flowchart illustrating an information processing method according to the second exemplary embodiment.

FIG. 11 is a flowchart illustrating an information processing method according to the third exemplary embodiment.

DESCRIPTION OF THE EMBODIMENTS

In a first exemplary embodiment, the term "virtual object" refers to various forms of information, such as a sentence, an image, and a video image, to be superimposed and displayed on an image of a real space to correspond to an object (real object) in the real space. In the first exemplary embodiment, a configuration will be described in which the name of a real object in a balloon will be displayed as a virtual object.

Hereinafter, the first exemplary embodiment will be described in detail with reference to the drawings.

Figure 1A:
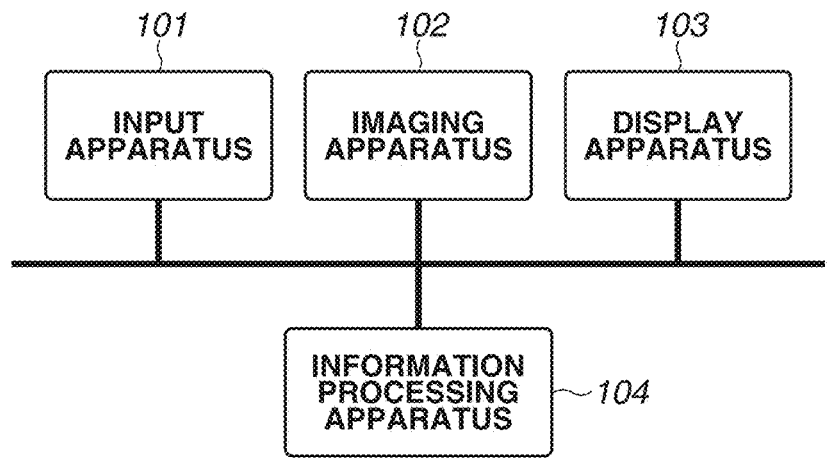
FIGS. 1A, 1B, and 1C are block diagrams each illustrating a configuration of an information processing system according to a first exemplary embodiment.
Figure 1B:
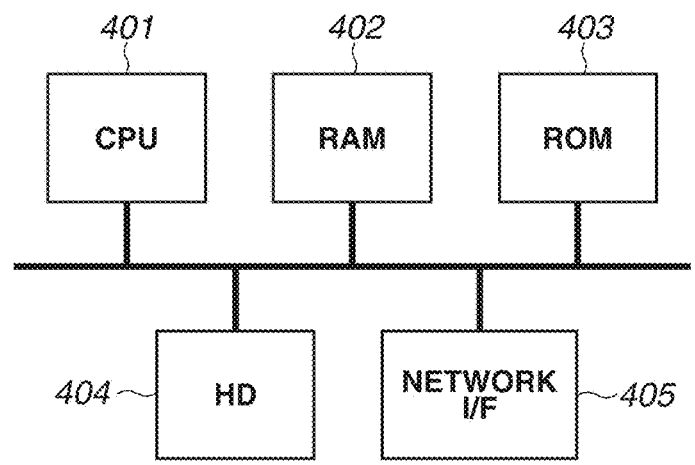
Figure 1C:
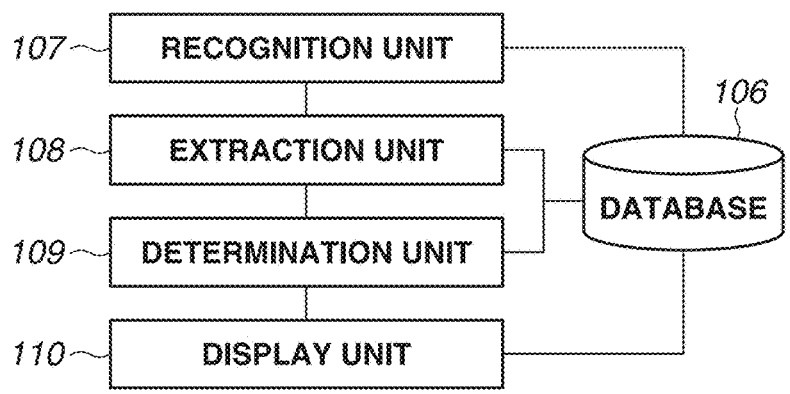

FIGS. 1A to 1C are block diagrams each illustrating a configuration of an information processing system according to the present exemplary embodiment. FIG. 1A illustrates a hardware configuration of an object display system. In FIG. 1A, an input apparatus 101 receives various types of inputs from a user. More specifically, the input apparatus 101 includes a mouse, a keyboard, and a touch interface. The input apparatus 101 receives, for example, input of a command for changing to a mode for displaying a virtual object or input of a command for ending the display of a virtual object.

An imaging apparatus 102 is a camera for capturing an image of a real space as a two-dimensional image. The imaging apparatus 102 outputs a captured image to an information processing apparatus 104 (described below). A display apparatus 103 is a display for displaying an image captured by the imaging apparatus 102, information (virtual object) to be provided to the user, and the like.

The information processing apparatus 104 includes a processor and a memory. The processor controls the entire information processing apparatus 104 and also controls each of the apparatuses described above to control the transfer of necessary data among the apparatuses. The memory stores programs that cause each function unit (described below) according to the present exemplary embodiment to function. FIG. 1B is a block diagram illustrating a hardware configuration of the information processing apparatus 104. A central processing unit (CPU) 401 executes a program stored in a read-only memory (ROM) 403 or a hard disk (HD) 404 to realize a functional configuration of the information processing apparatus 104 and the processing of flowcharts to be executed by the information processing apparatus 104, which will be described below. A random access memory (RAM) 402 is a storage area that functions as a work area for the CPU 401 to load and execute a program. The ROM 403 is a storage area for storing a program to be executed by the CPU 401. The HD 404 is a storage area for storing various types of programs needed for execution of processing by the CPU 401, and images captured by the imaging apparatus 102. A network interface (I/F) 405 connects the information processing apparatus 104 to an external device.

The apparatuses described above may be connected via an electronic circuit or a network. For example, a mobile phone line network or the Internet is applicable to the network. While the above-described configuration of the information processing system includes the apparatuses that are separately configured, the apparatuses may be integrated together. That is, an information processing apparatus itself may include hardware mechanisms such as an imaging apparatus and a display apparatus.

FIG. 1C is a function block diagram illustrating a software configuration of the information processing apparatus 104. A database 106 is on the HD 404 and stores various types of information needed to determine the display position of a virtual object on an image displayed on the display apparatus 103. More specifically, in the present exemplary embodiment, as described below, the database 106 stores class information of a target real object for virtual object display, importance information of a real object, and a list of virtual object information. The virtual object information includes the shape of a virtual object, the bounding rectangle size of the virtual object, the corresponding real object, and the contents of the virtual object (information to be displayed).

A recognition unit 107 recognizes the position and region of an object (real object) in a real space from an image captured by the imaging apparatus 102, and outputs the type, position, and shape of the real object. An extraction unit 108 extracts, based on the real object information output from the recognition unit 107, a real object for which a virtual object is to be displayed in association with the real object, and outputs a list of target real objects for virtual object display.

A determination unit 109 determines in which position on a captured image a virtual object is to be displayed, and outputs virtual object display position information. As described below, the determination unit 109 determines the display position based on the importance (importance map) of each real object, and the scores (position map) corresponding to distances from a target real object. A display unit 110 superimposes a virtual object on a captured image based on the virtual object display position information and outputs the image with the virtual object superimposed thereon.

FIG. 2 is a flowchart of an information processing method for displaying an object, which is executed by the information processing apparatus 104 according to the present exemplary embodiment. First, in step S201, the recognition unit 107 acquires an image that is input from the imaging apparatus 102, performs semantic region segmentation on the image, and assigns class information to each region in the image to recognize an object in the image.

The semantic region segmentation is a technique for segmenting a captured image into a plurality of regions and recognizing, for each of the regions, a class relating to the classification of an object. In the present exemplary embodiment, a method discussed in "Efficient Inference in Fully Connected CRFs with Gaussian Edge Potentials, P. Krahenbuhl, Advances in Neural Information Processing Systems 2011" is used as a method for the semantic region segmentation. Briefly, the method includes recognizing a class of each region based on a feature amount extracted from the region. Detailed description of the method is omitted here. According to the method discussed in "Efficient Inference in Fully Connected CRFs with Gaussian Edge Potentials, P. Krahenbuhl, Advances in Neural Information Processing Systems 2011", region segmentation and class recognition are performed concurrently for each pixel by using a conditional random field (CRF). According to the above-described method, a class of each pixel is recognized based on not only the feature amount extracted from each pixel but also class co-occurrence between adjacent pixels.

Figure 3A:
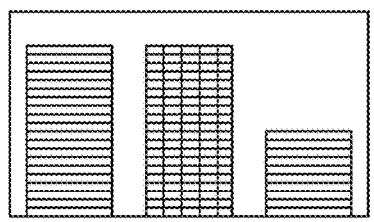
FIGS. 3A, 3B, 3C, 3D, 3E, 3F, 3G, and 3H illustrate a series of processing of an information processing method according to the first exemplary embodiment.

FIGS. 3A to 3H illustrate a series of processing in the information processing display method according to the present exemplary embodiment. In the present exemplary embodiment, an image input from the imaging apparatus 102 includes "the sky" as a background and three buildings "building A", "building B", and "building C" arranged in this order from the left, as illustrated in FIG. 3A.

Figure 3B:
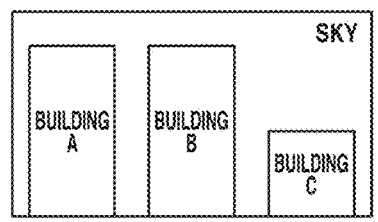

FIG. 3B illustrates an example of a result of the semantic region segmentation according to the present exemplary embodiment. The result illustrated in FIG. 3B is obtained when the recognition unit 107 performs the semantic region segmentation on the input image in step S201. In this example, the image is first segmented into a sky region and building regions, and then the buildings are recognized as "building A", "building B", and "building C", from their features. Consequently, "sky", "building A", "building B", and "building C" are assigned to the corresponding regions as class information.

Referring back to FIG. 2, in step S202, the recognition unit 107 generates an importance map. More specifically, the recognition unit 107 refers to real object importance information recorded in the database 106 to assign importance to each of the regions obtained in step S201, and generates an importance map of the same size as that of the input image.

FIG. 4 illustrates the real object importance information recorded as a table in the database 106. In the present exemplary embodiment, the values of 0.1, 0.8, 0.7, and 0.7 are set to "sky", "building A", "building B", and "building C", respectively, as the importance of each real object. The importance is an index indicating the allowable degree of superimposition of a virtual object on an object and is represented by a value of 0 to 1 for each object. A higher numerical value of the importance indicates a higher cost of superimposition of a virtual object on a real object (superimposed display is unsuitable).

Figure 3C:
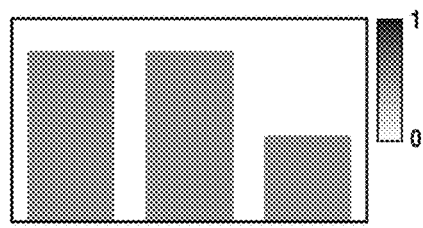

The recognition unit 107 assigns the importance of a real object to the value $v_i$ of each pixel $(x_i, y_i)$ within each region in the importance map based on the importance information illustrated in FIG. 4. FIG. 3C illustrates an importance map in which the importance is assigned to each pixel in a manner described above. In FIG. 3C, a darker region indicates higher importance.

Next, in step S203, the extraction unit 108 extracts, from the regions obtained in step S201, a real object for which a virtual object is to be displayed in association with the real object. As described above, the class information of a target real object for virtual object display is stored in the database 106, and in the present exemplary embodiment, "building A" and "building B" are set as the target real objects for virtual object display. Accordingly, the extraction unit 108 extracts the real objects corresponding to "building A" and "building B." This extraction processing is performed by comparing the class information of each region obtained by segmenting the input image, to the name of a target real object for virtual object display stored in the database 106. When the extraction of the real objects for virtual object display is completed, the extraction unit 108 adds the names of the real objects for virtual object display to a target real object list for virtual object display, and outputs the target real object list. The target real object list is stored in the database 106.

Next, in step S204, the determination unit 109 generates a position map of the same size as that of the input image, for each real object for which a virtual object is to be displayed in association with the real object. The position map two-dimensionally represents the scores corresponding to the distances from the real object for which a virtual object is to be displayed, and indicates the degree to which the virtual object can be placed in each position. In the position map, a numerical value of 0 to 1 is set to each of coordinates, and a higher numerical value indicates a higher cost of placing the virtual object (placement is unsuitable).

The following describes the position map corresponding to "building A". First, the determination unit 109 obtains the center of gravity ($x_c$, $y_c$) of "building A" from the following Formula 1

$$(x_c, y_c) = \left( \frac{1}{n}\sum_{i=1}^{n} x_i, \frac{1}{n}\sum_{i=1}^{n} y_i \right).$$ [Formula 1]

In Formula 1, $x_i$ and $y_i$ are respectively x and y coordinates of pixels constituting "building A" in the image. Next, the determination unit 109 calculates a value pi of each point ($x_i$, $y_i$) on the position map from the following Formula 2

$$p_i = \min\left( \left( \frac{\sqrt{(x_i - x_c)^2 + (y_i - y_c)^2}}{\alpha} \right), 1 \right).$$ [Formula 2]

Figure 3D:
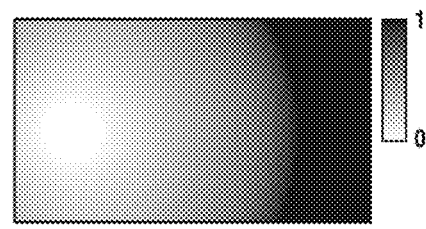

In Formula 2, $\alpha$ is a constant and, for example, in the case of $\alpha$=256, the value $p_i$ increases linearly from 0 to 1 within the range up to the 256th pixels from the center of gravity, and the value $p_i$ is 1 in the range outside the 256th pixels. FIG. 3D illustrates the position map corresponding to "building A". In FIG. 3D, a darker region indicates a higher value, showing that the color is darker with greater distances from the center of gravity of "building A" to indicate a higher value.

Next, in step S205, the determination unit 109 combines the importance map generated in step S202 and the position map generated in step S204 to generate a display priority score map for each real object for which a virtual object is to be displayed. Similarly to the position map, the display priority score map indicates the degree to which the virtual object can be placed in each position. In the display priority score map, a value of 0 to 1 is set to each of coordinates, and a higher numerical value indicates a higher cost of placing the virtual object (placement is unsuitable). A score $s_i$ of each pixel ($x_i$, $y_i$) in the display priority score map obtained by combining the importance map and the position map is calculated from the following Formula 3: $S_i$=min ($v_i$+$p_i$, 1).

Figure 3E:
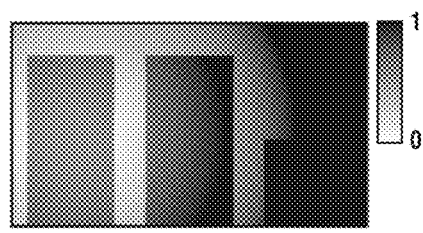

FIG. 3E illustrates the display priority score map corresponding to "building A". In FIG. 3E, a darker region indicates a higher value. In the present exemplary embodiment, while a score of each of coordinates in the display priority score map is obtained by adding the numerical value in the importance map to the numerical value in the position map, various types of calculations such as weighting can be applied.

Next, in step S206, the determination unit 109 calculates, in each point on the display priority score map, the sum of scores of pixels existing within the virtual object. More specifically, the determination unit 109 first acquires from the database 106 the bounding rectangle size of the virtual object. FIGS. 5A and 5B each illustrate a list of virtual object information stored in the database 106, and each virtual object number is associated with the shape of a virtual object, the bounding rectangle size, the corresponding real object, and the contents to be displayed. FIG. 5A illustrates information of the respective virtual objects corresponding to "building A" and "building B". The determination unit 109 refers to the database 106 and acquires, for example, the information "50×30 pixel" as the bounding rectangle size of the virtual object corresponding to "building A".

Figure 3F:
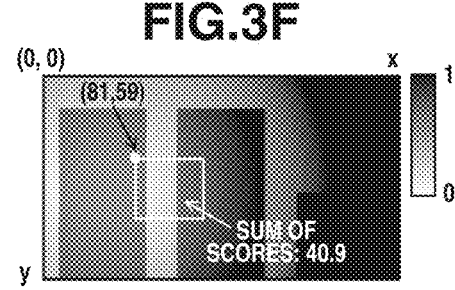

Next, the determination unit 109 calculates, for each of the regions of 50×30 pixels on the display priority score map, the sum of scores of pixels existing within the region. At this time, the determination unit 109 uses the coordinates of the upper left of the bounding rectangle as a key to calculate the sum of scores, as illustrated in FIG. 3F, and stores the calculation results in a score sum list. FIGS. 6A and 6B each illustrate an example of the sum of scores within the bounding rectangle region at each of coordinates, which is stored in the score sum list. FIG. 6A illustrates the score sum list for "building A", and FIG. 6B illustrates the score sum list for "building B". The determination unit 109 calculates the sum of scores of all the pixels on the display priority score map, and then sets a calculation completion flag for the virtual object.

In step S207, the determination unit 109 determines, based on the flag, whether a score sum list is generated for each of the real objects in the target real object list stored in the database 106. If the determination unit 109 determines that a score sum list is generated for each of the real objects in the target real object list (YES in step S207), the processing proceeds to step S208. On the other hand, if a score sum list is not generated for each of the real objects in the target real object list (NO in step S207), the processing returns to step S204, and the processing is continued until all the score sum lists are generated.

Next, in step S208, the determination unit 109 determines the display positions of the virtual objects to be displayed, based on the score sum lists generated in step S206.

First, the determination unit 109 selects one set of coordinates from the score sum list for "building A", and provisionally determines the position of the virtual object corresponding to "building A". In the present exemplary embodiment, the coordinates (0, 0) are selected as an example. Next, the determination unit 109 selects one set of coordinates from the score sum list for "building B". At this time, since the display position of the virtual object corresponding to "building A" is provisionally set to the coordinates (0, 0), the coordinates within the display region of the virtual object corresponding to "building A" are invalidated, and from the score sum list for "building B", one set of coordinates other than the invalidated coordinates is selected. In a case where the display position of the virtual object corresponding to "building A" is provisionally set to the coordinates (0, 0), since the bounding rectangle size of the virtual object is 50×30 pixels, the coordinates (0, 0) to (49, 29) in the score sum list for "building B" are invalidated. In the present exemplary embodiment, the coordinates (50, 0) are selected from the score sum list of "building B" as an example. Then, the determination unit 109 totals the sums of the scores of the respective selected coordinates. As illustrated in FIG. 6A, the sum of scores of the coordinates (0, 0) is 104.5 in the score sum list for "building A". As illustrated in FIG. 6B, the sum of scores of the coordinates (50, 0) in the score sum list for "building B" is 863.9. Accordingly, the total value is 968.4.

Similarly, the total value is calculated for all the possible combinations among the combinations of the coordinates included in the score sum list for "building A" and the coordinates included in the score sum list for "building B", and the combination of the coordinates that has the smallest total value is determined as the display positions of the virtual objects. In the present exemplary embodiment, the coordinates (81, 59) is determined as the display position of the virtual object corresponding to "building A", and the coordinates (161, 51) is determined as the display position of the virtual object corresponding to "building B". Information of the determined display positions of the virtual objects is stored in the database 106.

In step S209, the display unit 110 superimposes, based on the information of the virtual object display positions determined in step S208, the virtual objects on the image captured by the imaging apparatus 102, and outputs the image with the virtual objects superimposed thereon. In the present exemplary embodiment, the virtual object corresponding to the real object "building A" is superimposed on the image in such a way that the upper left coordinates are the coordinates (81, 59) specified in the virtual object display position information. The virtual object corresponding to the real object "building B" is superimposed on the image in such a way that the upper left coordinates are the coordinates (161, 51) specified in the virtual object display position information.

Figure 3G:
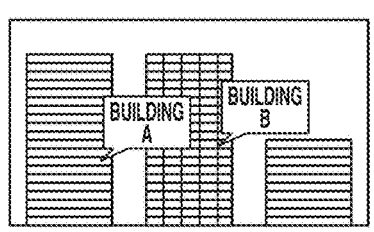

FIG. 3G illustrates how the virtual objects corresponding to the real objects "building A" and "building B" are superimposed on the image according to the present exemplary embodiment. The superimposed image generated in this way is output to the display apparatus 103, and the display apparatus 103 provides the superimposed image to the user.

Figure 3H:
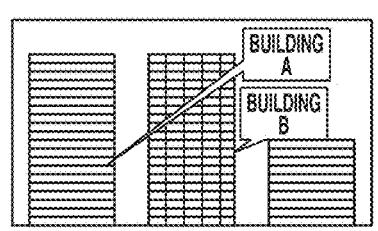

On the other hand, FIG. 3H illustrates how virtual objects are superimposed and displayed on an image according to the conventional method discussed in Japanese Patent Application Laid-Open No. 2011-242934. According to the method discussed in Japanese Patent Application Laid-Open No. 2011-242934, a virtual object is displayed in such a way to avoid a real object on which superimposition of a virtual object is prohibited. Thus, as illustrated in FIG. 3H, the virtual object corresponding to "building A" is displayed in a position far from a position in which the virtual object is supposed to be displayed.

In the present exemplary embodiment, an importance value of 0 to 1 is set as the information indicating the allowable degree of superimposition of a virtual object on each real object, and the display position of a virtual object is determined based on the set importance values and the scores (position map) corresponding to the distances from a target real object. In this way, a virtual object to be displayed in association with a real object can be displayed in a more appropriate position according to the present exemplary embodiment.

In step S210, the processor of the information processing apparatus 104 determines whether a virtual object display end command is input from the input apparatus 101. If no virtual object display end command is input (NO in step S210), the processing returns to step S201, and the processing is continued. On the other hand, if a virtual object display end command is input (YES in step S210), the processing is ended.

In the present exemplary embodiment, the display position of a virtual object is determined based on the importance (importance map) as the information indicating the allowable degree of superimposition of the virtual object on each real object, and the scores (position map) corresponding to the distances from a target real object. More specifically, the importance map and the position map are combined together to generate a display priority score map, and then the display position of a virtual object is determined based on the display priority score map. The above-described configuration according to the present exemplary embodiment enables a virtual object to be displayed more appropriately.

While the display position of a virtual object is determined based on the display priority score map in the present exemplary embodiment, the position of a virtual object may be fixed with respect to a real object and, instead, other display conditions may be changed and determined. Examples of other display conditions include the shape and size of the virtual object, the transparency of the virtual object, and the information amount of the virtual object.

For example, in the case of the shape and size of the virtual object, the shape of the virtual object may be changed according to the shape of a region having a low score in the display priority score map, or the size of the virtual object may be changed according to a region having a low score in the display priority score map. In a case where the virtual object is a balloon, the shape of the balloon may be changed. In the case of the transparency of the virtual object, the scores in the priority score map may be associated with the transparency to decrease the transparency of the virtual object with lower scores. In the case of the information amount of the virtual object, the area of a region having a score equal to or lower than a predetermined score in the priority score map may be calculated, and information may be displayed to the degree that it can fit in the area.

Further, a plurality of display conditions selected among the display position of the virtual object, the shape and size of the virtual object, the transparency of the virtual object, and the information amount of the virtual object may be changed and determined based on the display priority map.

While the semantic region segmentation technique is used to recognize an image in the present exemplary embodiment, any other method can be used by which a real object for which a virtual object is to be displayed can be distinguished from other real objects and regions, and recognized. For example, an object detection method that uses template matching may be used.

Further, while a real object is specified as a target for which a virtual object is to be displayed in association with the target in the present exemplary embodiment, a group of real objects or an arbitrary region specified by a user can be specified as the target, aside from a real object.

Further, while the importance of a real object is predetermined and this information is stored in the database 106 in the present exemplary embodiment, the method for setting the importance is not limited thereto. For example, a region in focus and a region out of focus in an input image may be detected, and the importance of the region in focus may be set high and the importance of the region out of focus may be set low. Further, for example, a user may be allowed to change the importance stored in the database 106 by using the input apparatus 101.

Further, while the importance is defined for each real object in the present exemplary embodiment, a specific real object may always have the importance value of 1. In this way, the display position of a virtual object can be determined so as not to be superimposed on the specific real object.

Further, while the bounding rectangle size of a virtual object is stored in the database 106 in the present exemplary embodiment, the bounding rectangle size may dynamically be generated. For example, the bounding rectangle size may be generated proportionally to the size of a target real object for virtual object display.

Further, the score sum calculation method described in the present exemplary embodiment is a mere example, and there are various other calculation methods. For example, the sum of scores of coordinates, which are included in the virtual object shape itself, may be calculated instead of the sum of scores of coordinates included in the bounding rectangle of the virtual object. Further, as described in the present exemplary embodiment, in a case where the virtual object is a balloon, the sum of scores of coordinates included in a rectangular portion where information is to be displayed may be calculated. In any case, the sum of scores of coordinates included in the region corresponding to the virtual object has only to be calculated.

Further, the display position determination method described in the present exemplary embodiment is a mere example, and there are various other methods. For example, only small sums of scores may be collected from the respective score sum lists for virtual objects to calculate a total value, whereby the number of combinations can be reduced. Further, while superimposition of a virtual object on another virtual object is not allowed in the first exemplary embodiment, superimposition of a virtual object on another virtual object may be allowed. In a case where superimposition of a virtual object on another virtual object is allowed, for example, the regions of the virtual objects may be weighted at the time of calculating a total value to avoid superimposition of a virtual object on another virtual object as much as possible.

Further, while a virtual object is placed on a two-dimensional space in the present exemplary embodiment, it is also possible to place a virtual object on a three-dimensional space. This can be realized by, for example, measuring the distance to each real object with a distance measurement apparatus and generating a three-dimensional display priority score map based on the importance map and the position map that also consider a depth direction.

Further, in the present exemplary embodiment, for example, global positioning system (GPS) information may be used to change the real object for which a virtual object is to be displayed, according to the position (location). In this way, the position of the user can be detected using GPS to determine the target object for virtual object display according to the position of the user.

In a second exemplary embodiment of the present invention, a configuration will be described in which a region of interest of the user is also considered in determining the display position of a virtual object. Components that have already been described in the first exemplary embodiment are given the same reference numerals, and the description thereof will be omitted.

Figure 7A:
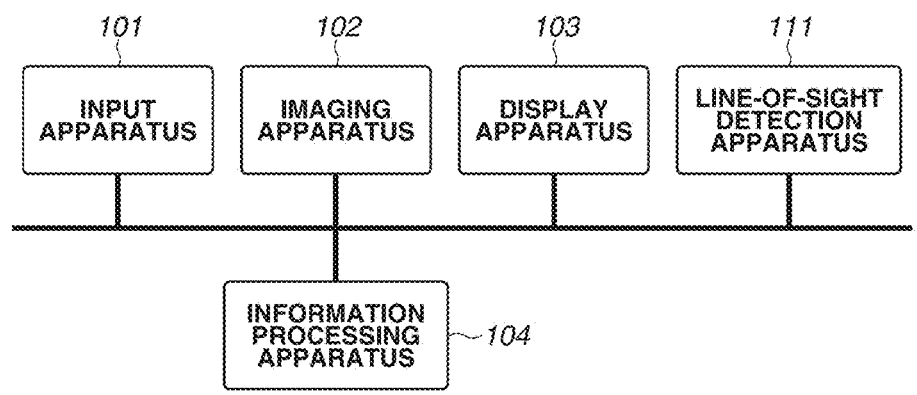
FIGS. 7A and 7B are block diagrams each illustrating a configuration of an information processing system according to a second exemplary embodiment.
Figure 7B:
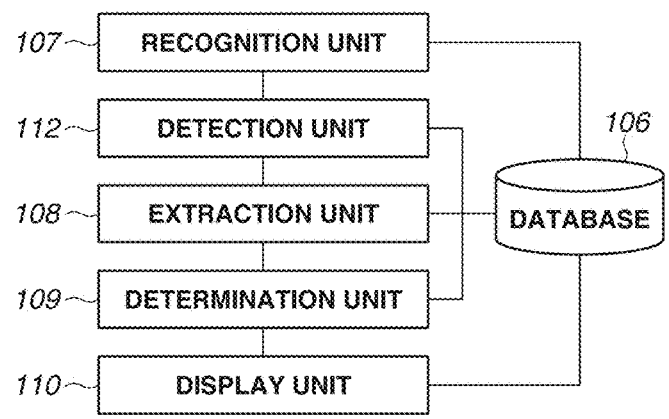

FIGS. 7A and 7B are block diagrams each illustrating a configuration of an information processing system according to the present exemplary embodiment. FIG. 7A illustrates a hardware configuration of the information processing system according to the present exemplary embodiment. In FIG. 7A, a line-of-sight detection apparatus 111 detects the line-of-sight direction of the user who is using the information processing system, and outputs the detected line-of-sight direction. The line-of-sight detection apparatus 111 includes a camera for capturing an image of eyes of the user, and detects the line-of-sight direction of the user based on the positional relationship between the positions of pupils of the eyes of the user and the position of the camera. A technique for detecting the line-of-sight direction of a user with a camera is a well-known technique, and the description of detailed processing of the detection will thus be omitted.

FIG. 7B is a block diagram illustrating a software configuration of the information processing apparatus 104 according to the present exemplary embodiment. A detection unit 112 detects a real object of interest of the user based on information of the line-of-sight direction of the user that is output from the line-of-sight detection apparatus 111, and information of a real object (type, position, and shape of the real object) that is output from the recognition unit 107. Information of a target real object for virtual object display is stored in the database 106, and in the present exemplary embodiment, "building A" is set as the target real object.

Figure 9A:
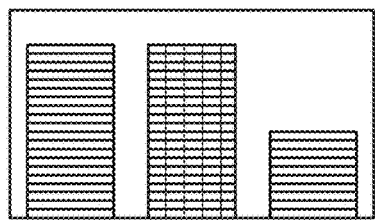
FIGS. 9A, 9B, 9C, 9D, 9E, 9F, and 9G illustrate a series of processing of an information processing method according to the second exemplary embodiment.
Figure 9B:
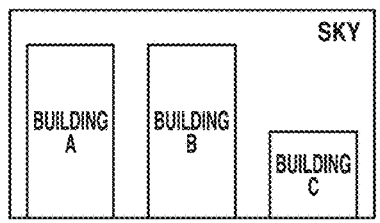
Figure 9C:
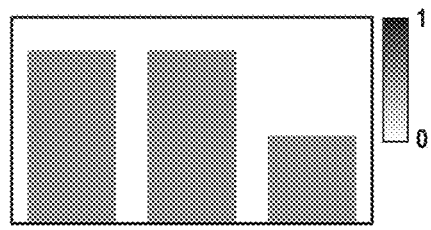

FIG. 8 is a flowchart illustrating an information processing method to be executed by the information processing apparatus 104 according to the present exemplary embodiment. Steps S801 and S802 are similar to steps S201 and S202 in the first exemplary embodiment, and the description of steps S801 and S802 will thus be omitted. Also in the present exemplary embodiment, an image input from the imaging apparatus 102 includes "the sky" as a background and three buildings "building A", "building B", and "building C" arranged in this order from the left, as illustrated in FIG. 9A. Thus, a result of the semantic region segmentation and a result of the importance map generation are similar to those in the first exemplary embodiment. More specifically, as illustrated in FIG. 9B, the class information "sky," "building A", "building B", and "building C" are assigned to the corresponding regions by the semantic region segmentation performed in step S201. The importance map generated in step S802 is similar to that generated in the first exemplary embodiment, as illustrated in FIG. 9C.

Returning to FIG. 8, in step S803, the detection unit 112 detects a region of interest. More specifically, the detection unit 112 determines, as the region of interest, a real object existing in the line-of-sight direction based on the line-of-sight direction detected by the line-of-sight detection apparatus 111. For example, if the line-of-sight direction of the user is a point (s, t) on the display screen of the display apparatus 103, the detection unit 112 determines which region obtained by the semantic region segmentation in step S801 the point (s, t) belongs to. As a result of the determination, a region including the point (s, t) is determined as the region of interest and is then output. In the present exemplary embodiment, "building B" is assumed to be determined as the region of interest.

Figure 9D:
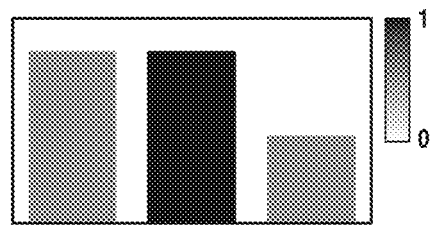

Next, in step S804, the detection unit 112 updates the importance within the region of interest in the importance map. More specifically, the importance value of is assigned to each pixel vi within the region of interest ("building B") in the importance map generated in step S802. FIG. 9D illustrates the importance map updated in step S804. In FIG. 9D, since the importance of the region of interest ("building B") is updated to 1, the region corresponding to "building B" is shown in dark color. While the importance in the region of interest is updated to 1 in the present exemplary embodiment, the importance may be updated to any relatively large value other than 1.

Figure 9E:
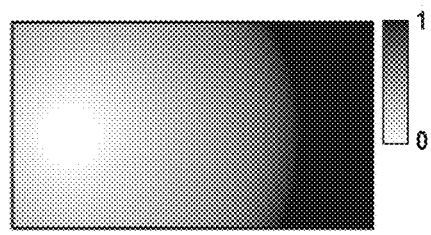
Figure 9F:
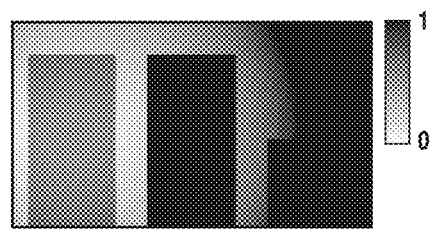
Figure 9G:
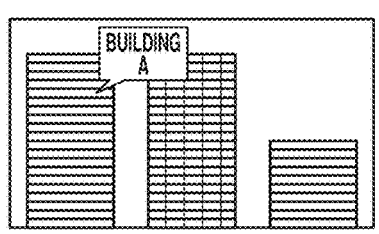

Steps S805, S806, and S807 following step S804 are similar to steps S203, S204, and S205 in the first exemplary embodiment. FIG. 9E illustrates the position map for "building A" generated by the determination unit 109 in step S806. FIG. 9F illustrates a priority score map generated by combining the importance map and the position map for "building A" together in step S807. In the present exemplary embodiment, since the importance of the region of interest ("building B") in the importance map is updated to 1 in step S804, the importance of the region corresponding to "building B" is also high in the priority score map illustrated in FIG. 9F.

Further, steps S808 and S809 are similar to steps S206 and S207 in the first exemplary embodiment. Through the foregoing steps, also in the present exemplary embodiment, a score sum list is generated for each real object in the target real object list for virtual object display. In the present exemplary embodiment, since the target real object for virtual object display is "building A", the score sum list for the real object "building A" is generated.

Next, in step S810, as in the first exemplary embodiment, the determination unit 109 determines the display position of the virtual object to be displayed. In the present exemplary embodiment, since the number of virtual objects to be displayed is 1, the processing for calculating a total value based on score sum lists is unnecessary, and the coordinates having the smallest sum of scores are determined as the display position of the virtual object corresponding to "building A". In a case where a plurality of virtual objects is to be displayed, as in the first exemplary embodiment, the total sums of scores are calculated for all the possible combinations of coordinates to determine the display position of each virtual object.

Steps S811 and S812 are similar to steps S209 and S210 in the first exemplary embodiment. In step S811, the display unit 110 generates a superimposed image and outputs the superimposed image to the display apparatus 103. The display apparatus 103 provides the superimposed image to the user. Then, in step S812, the processor of the information processing apparatus 104 determines whether a virtual object display end command is input from the input apparatus 101 to determine whether to continue the processing.

As described above, in the present exemplary embodiment, the region of interest of the user is detected, and the display position of a virtual object is determined based on the detected region of interest in addition to the importance (importance map) and the distances from a target real object (position map). More specifically, the detection unit 112 updates the importance of a real object corresponding to the detected region of interest. Then, the display position of the virtual object is determined based on the updated importance (importance map) and the position map. The above-described configuration according to the present exemplary embodiment considers the region of interest of the user, enabling a virtual object to be displayed more appropriately.

While the method of detecting a region of interest based on the line of sight of a user is used as the region-of-interest detection method in the present exemplary embodiment, any other method may be used to detect the region of interest. For example, conventional techniques for detecting a major object in an image and an abnormal region in an image have been known, and any of the techniques may be used to detect the region of interest.

Further, while the importance of the region of interest is set to a fixed value in the present exemplary embodiment, the value may be variable. For example, the importance may be changed according to the time during which the user pays attention to the region.

In a third exemplary embodiment of the present invention, a configuration will be described in which a temporal change in a real object is considered in determining the display position of a virtual object. Components that have already been described in the first or second exemplary embodiment are given the same reference numerals, and the description thereof will thus be omitted.

Figure 10:
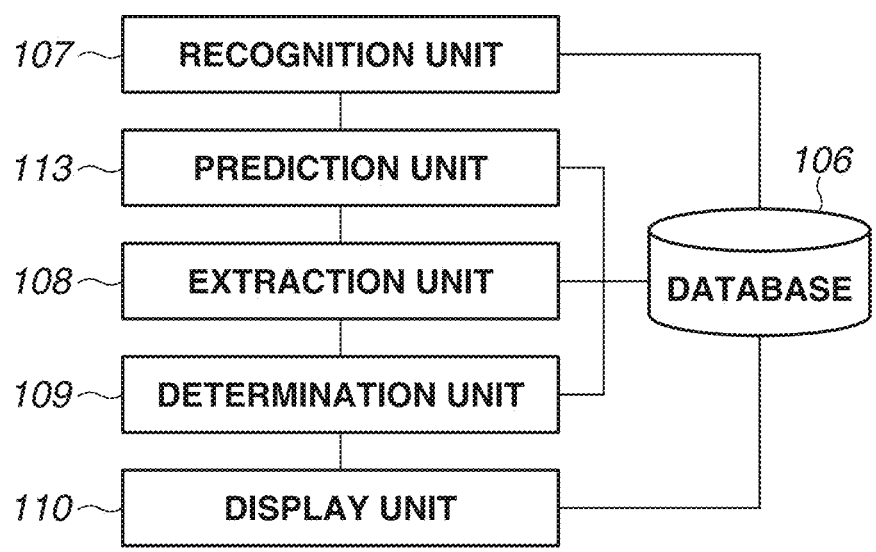
FIG. 10 is a block diagram illustrating a software configuration of an information processing apparatus according to the third exemplary embodiment.

A configuration of an information processing system according to the present exemplary embodiment is similar to that of the information processing system according to the first exemplary embodiment. FIG. 10 is a block diagram illustrating a software configuration of the information processing apparatus 104 according to the present exemplary embodiment. In the present exemplary embodiment, the information processing apparatus 104 further includes a prediction unit 113, and the prediction unit 113 obtains an optical flow of each real object from a plurality of images captured at different times. Then, based on information of the optical flow of each real object, the importance map and the position map are updated. Information of a target real object for virtual object display is stored in the database 106, and in the present exemplary embodiment, "car F" is set as the target real object.

Figure 12A:
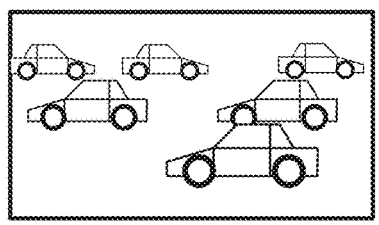
FIGS. 12A, 12B, 12C, 12D, 12E, 12F, 12G, and 12H illustrate a series of processing of an information processing method according to the third exemplary embodiment.
Figure 12B:
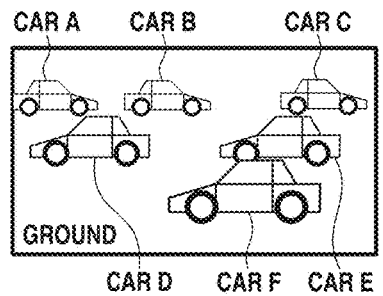

FIG. 11 is a flowchart illustrating an information processing method to be executed by the information processing apparatus 104 according to the present exemplary embodiment. Step S1101 is similar to step S201 in the first exemplary embodiment, and the description of step S1101 will thus be omitted. In the present exemplary embodiment, an image input from the imaging apparatus 102 includes "the ground" as a background and a total of six running cars, three of which are running from the left to the right and the other three from the right to the left, as illustrated in FIG. 12A. In step S1101, the semantic region segmentation is performed on the input image to assign "ground", "car A", "car B", "car C", "car D", "car E", and "car F" to the corresponding regions as class information, as illustrated in FIG. 12B. The three cars running from the left to the right are assigned "car A", "car B", and "car C", respectively, in this order from the left, and the three cars running from the right to the left are assigned "car D", "car E", and "car F", respectively in this order from the right.

Figure 12C:
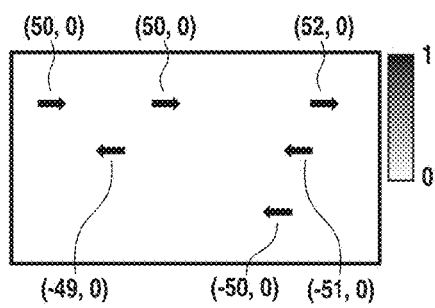

Next, in step S1102, the prediction unit 113 calculates an optical flow of each real object based on the input image of the previous frame stored in the memory of the information processing apparatus 104, a result of the semantic region segmentation performed on the input image of the previous frame, and the input image of the current frame. The optical flow is obtained by associating an object in an image with the object in an image, which are captured at different times and then representing the amount of movement of the object with a vector, whereby the next movement can be predicted. While many methods for obtaining an optical flow are known, a block matching method in which a result of recognizing each real object is used as a template is used in the present exemplary embodiment. Since the block matching method is well known, the detailed description of the method will thus be omitted. First, using a region of a real object existing in the previous frame as a template, the prediction unit 113 checks a neighborhood area of the position on the current frame that is same as that on the template. Then, a center point of the position that best matches the template is obtained, and a center position ($cx_t$, $cy_t$) of the matched position is subtracted from a center position ($cx_{t-1}$, $cy_{t-1}$) of the original template to obtain the optical flow. The prediction unit 113 performs the foregoing processing on the real objects to obtain the optical flow of each real object. FIG. 12C illustrates obtained optical flows of "car A", "car B", "car C", "car D", "car E", and "car F".

Next, in step S1103, the recognition unit 107 generates an importance map based on the optical flows obtained in step S1102. In step S1103, the recognition unit 107 adds a template importance map to the importance map while gradually moving the template importance map in the direction of the optical flow. As used herein, the template importance map refers to a map in which the importance is set for a region having the same shape as that of a real object.

The template importance map will be described below using "car A" as an example. In the present exemplary embodiment, the importance of "ground" is 0, and the importance of every "car" is 1. Further, the position of the center of gravity of "car A" on the current frame is (50, 50), and the optical flow is (50, 0), as illustrated in FIG. 12C. At this time, the importance v of "car A" in the template importance map is calculated by the following Formula 4

$$v = \frac{V}{\sqrt{ox^2 + oy^2} \times 2}.$$ [Formula 3]

In Formula 4, V is the preset importance of "car A", ox is the optical flow of "car A" in the x-direction, and oy is the optical flow of "car A" in the y-direction. As a result of calculation using the values specified above, v=0.01 is obtained. More specifically, in the template importance map for "car A", a region having the shape of "car A" and a pixel value of 0.01 is obtained.

Then, in step S1103, the recognition unit 107 adds the template importance map to the importance map along the direction of the optical flow. In the present exemplary embodiment, the recognition unit 107 adds the template importance map to the importance map by shifting the template importance map by 1 pixel from the position of the center of gravity (50,50) to the position (150, 50), which is twice the length of the optical flow. The length L, which is twice the length of the optical flow, is a value calculated by the following Formula 5

$$L=\sqrt{ox^2+oy^2}\times 2=\sqrt{50^2+0^2}\times 2=100.$$ [Formula 4]

Figure 12D:
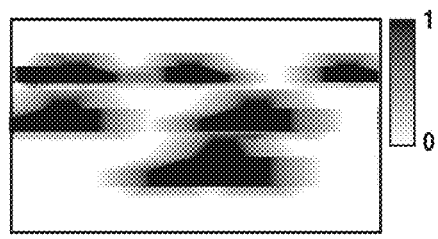

The recognition unit 107 performs the foregoing processing on all the real objects. FIG. 12D illustrates the importance map obtained as a result of the foregoing processing.

Step S1104 is similar to step S203 in the first exemplary embodiment. As described above, in the present exemplary embodiment, "car F" is set as the target real object for virtual object display. Thus, in step S1104, "car F" is extracted and output to the target real object list.

Figure 12E:
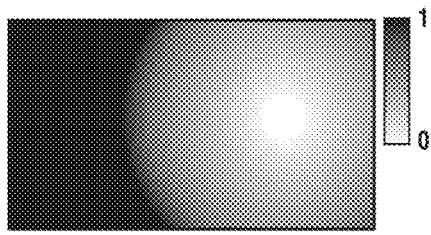

Then, in step S1105, the determination unit 109 first generates a template position map and then generates a position map using the template position map. The template position map is a map that two-dimensionally represents the scores corresponding to the distances from a real object for which a virtual object is to be displayed in association with the real object. The template position map is generated by a similar procedure as that for generating the position map in the first exemplary embodiment. FIG. 12E illustrates the generated template position map. Since the target real object for virtual object display is "car F" in the present exemplary embodiment, the color is darker and the value is higher with greater distances from the center of gravity of "car F" in FIG. 12E.

Next, the determination unit 109 generates a position map using the template position map. More specifically, as in step S1103, the determination unit 109 adds the template position map to the position map while gradually shifting the template position map along the direction of the optical flow. Thus, the determination unit 109 first adjusts the value of each pixel $p_i$ in the template position map to $p'_i$ so that the virtual object can be displayed using as a reference the position of the real object after an elapse of a predetermined time. The value of each adjusted pixel $p'_i$ is calculated by the following Formula 5.

$$p'_i = \frac{p_i}{\sqrt{ox^2 + oy^2} \times 2}.$$ [Formula 5]

Figure 12F:
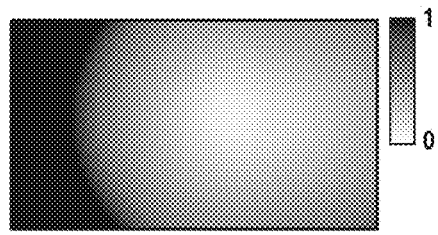

The determination unit 109 adds the template position map to the position map along the direction of the optical flow as in step S1103. In the present exemplary embodiment, the template position map is added to the position map by shifting the template position map by 1 pixel in the direction of the optical flow to the distance that is twice the length of the optical flow. As illustrated in FIG. 12C, the optical flow of "car F" is (−50, 0), and thus the length that is twice the optical flow is 100 as calculated according to Formula 5. Accordingly, the determination unit 109 adds the template position map to the position map by moving the template position map by 1 pixel leftward, and this is repeated until the amount of movement reaches 100. FIG. 12F illustrates the position map obtained in step S1105.

Figure 12G:
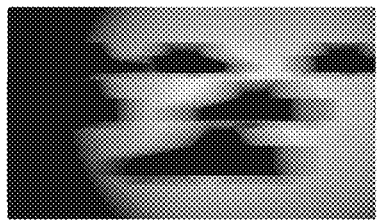
Figure 12H:
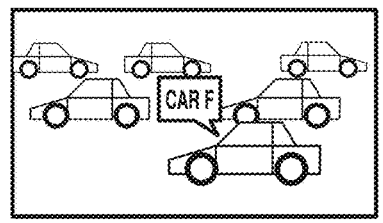

Next, in step S1106, the determination unit 109 generates a display priority score map for each real object for virtual object display, as in step S205 in the first exemplary embodiment. In the present exemplary embodiment, since "car F" is set as the target real object for virtual object display, a display priority score map corresponding to "car F" is generated. FIG. 12G illustrates the display priority score map corresponding to "car F" in the present exemplary embodiment.

Steps S1107, S1108, and S1109 following step S1106 are similar to steps S206, S207, and S208 in the first exemplary embodiment. In step S1107, the determination unit 109 first refers to the database 106 to acquire information of the bounding rectangle size of the virtual object corresponding to the target real object "car F" for virtual object display. In FIG. 5B, information of the virtual object corresponding to "car F" in the present exemplary embodiment is illustrated. Thereafter, the determination unit 109 calculates, on the generated display priority score map, the sum of scores of pixels existing within the bounding rectangle region of the virtual object to be displayed, as in step S206 in the first exemplary embodiment. Further, in step S1108, the determination unit 109 generates a score sum list for the target real object "car F" for virtual object display. Then, in step S1109, the coordinates having the smallest sum of scores in the score sum list for "car F" is determined as the display position of the virtual object corresponding to the real object "car F".

Step S1110 is similar to step S209 in the first exemplary embodiment. The display unit 110 generates a superimposed image, and outputs the superimposed image to the display apparatus 103. The display apparatus 103 provides the superimposed image to the user.

In step S1111, the processor of the information processing apparatus 104 stores the input image of the current frame (illustrated in FIG. 12A) and the result of the semantic region segmentation (illustrated in FIG. 12B) in the memory of the information processing apparatus 104. The stored data is provided to the processing on the next frame.

Lastly, in step S1112, the processor of the information processing apparatus 104 determines whether a virtual object display end command is input from the input apparatus 101 to determine whether to continue the processing.

As the foregoing describes, in the present exemplary embodiment, a temporal change in an object is calculated, and the display position of a virtual object is determined based on the calculated temporal change, in addition to the importance (importance map) and the distances from a target real object (position map). More specifically, the importance map and the position map are generated based on the calculated temporal change in the object. Then, the display position of the virtual object is determined based on the importance map and the position map generated based on the temporal change in the object. With the foregoing configuration according to the present exemplary embodiment, a temporal change in a real object is also considered to enable a virtual object to be displayed more appropriately.

In the present exemplary embodiment, the optical flow extraction method is not limited to the block matching method, and an optical flow may be extracted by a gradient method or any other method by which the movement of an object on the screen can be predicted. For example, if the movement of a real object can be predicted in advance by machine learning, its prediction result may be used, or a past history may be used.

Further, the methods for generating an importance map, a position map, or a display priority score map that have been described in the present exemplary embodiment are mere examples. For example, the template importance map and the template position map may be weighted when being added to the importance map and the position map, respectively.

Further, the information processing apparatuses described in the above exemplary embodiments are widely applicable to devices capable of superimposing and displaying a virtual object on an image of a real space. For example, the information processing apparatuses are applicable to wearable terminals, smartphones, etc.

The foregoing configurations according to the exemplary embodiments of the present invention enable a virtual object to be displayed more appropriately.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-229910, filed Nov. 12, 2014, which is hereby incorporated by reference herein in its entirety.

What is claimed is:

1. An information processing apparatus comprising:
a recognition unit configured to recognize real objects in an acquired image of a real space and generate a first map of information indicating an allowable degree of superimposition of a virtual object on each of the recognized real objects, in which the information is represented by a numerical value for each of coordinates in the image of the real space;
an acquisition unit configured to acquire a second map of positional information indicating an allowable degree of display of the virtual object in each pixel of the acquired image based on a distance from a real object recognized in association with the virtual object, in which the distance is represented by a numerical value for each of the coordinates in the image of the real space;
a determination unit configured to determine a display condition for displaying the virtual object on the image of the real space based on the first map and the second map; and
a display control unit configured to superimpose and display the virtual object on the image of the real space based on the display condition.

2. The information processing apparatus according to claim 1, wherein the display condition includes at least one of a position in which the virtual object is to be displayed, a shape of the virtual object, a size of the virtual object, transparency of the virtual object, and an information amount of the virtual object.

3. The information processing apparatus according to claim 1, wherein the determination unit generates a third map by a calculation using the numerical value in the first map and the numerical value in the second map for each of the coordinates in the image of the real space.

4. The information processing apparatus according to claim 3, wherein, with respect to each of coordinates in the third map, a total of numerical values of coordinates included in a region corresponding to the virtual object to be displayed is calculated, and the display condition is determined based on the total of numerical values.

5. The information processing apparatus according to claim 1, wherein in a case where a plurality of the virtual objects is to be superimposed on the image of the real space, the determination unit determines the display condition in such a way that virtual objects of the plurality of virtual objects do not overlap each other.

6. The information processing apparatus according to claim 1, wherein the recognition unit recognizes the real objects based on a feature amount in each of a plurality of regions obtained by segmenting the image of the real space.

7. The information processing apparatus according to claim 1, further comprising a detection unit configured to detect a region of interest of a user in the image of the real space, wherein the determination unit determines the display condition based on the information, the distance, and the detected region of interest.

8. The information processing apparatus according to claim 1, further comprising a prediction unit configured to predict a temporal change in each of the recognized real objects,
wherein the determination unit determines the display condition based on the information, the distance, and the predicted temporal change.

9. The information processing apparatus according to claim 1,
wherein the allowable degree of display of the virtual object is highest at a position away from, by a predetermined distance, the real object.

10. An information processing method comprising:
recognizing real objects in an acquired image of a real space and generating a first map of information indicating an allowable degree of superimposition of a virtual object on each of the recognized real objects in which the information is represented by a numerical value for each of coordinates in the image of the real space;
acquiring a second map of positional information indicating an allowable degree of display of the virtual object in each pixel of the acquired image based on a distance from a real object recognized in association with the virtual object, in which the distance is represented by a numerical value for each of the coordinates in the image of the real space;
determining a display condition for displaying the virtual object on the image of the real space, based on the first map and the second map; and
superimposing and displaying the virtual object on the image of the real space based on the display condition.

11. A non-transitory computer-readable storage medium that stores instructions for causing a computer to perform the information processing method according to claim 10.

12. An information processing system comprising:
an information processing apparatus;
an imaging apparatus configured to capture an image of a real space; and
a display apparatus configured to display an image of the real space, the image being generated by the information processing apparatus and having a virtual object superimposed thereon,
wherein the information processing apparatus comprising:
a recognition unit configured to recognize real objects in an acquired image of a real space and generate a first map of information indicating an allowable degree of superimposition of a virtual object on each of the recognized real objects, in which the information is represented by a numerical value for each of coordinates in the image of the real space;
an acquisition unit configured to acquire a second map of positional information indicating an allowable degree of display of the virtual object in each pixel of the acquired image based on a distance from a real object recognized in association with the virtual object, in which the distance is represented by a numerical value for each of the coordinates in the image of the real space;
a determination unit configured to determine a display condition for displaying the virtual object on the image of the real space based on the first map and the second map; and
a display control unit configured to superimpose and display the virtual object on the image of the real space based on the display condition.

* * * * *